(12) United States Patent
Nakatani et al.

(10) Patent No.: US 10,988,549 B2
(45) Date of Patent: Apr. 27, 2021

(54) METHOD FOR PRODUCING CELLULOSE NANOFIBER DRY SOLID

(71) Applicant: NIPPON PAPER INDUSTRIES CO., LTD., Tokyo (JP)

(72) Inventors: Takeshi Nakatani, Tokyo (JP); Shinji Sato, Tokyo (JP)

(73) Assignee: NIPPON PAPER INDUSTRIES CO., LTD., Tokyo (JP)

( * ) Notice: Subject to any disclaimer, the term of this patent is extended or adjusted under 35 U.S.C. 154(b) by 54 days.

(21) Appl. No.: 16/065,213

(22) PCT Filed: Dec. 22, 2016

(86) PCT No.: PCT/JP2016/088371
§ 371 (c)(1),
(2) Date: Jun. 22, 2018

(87) PCT Pub. No.: WO2017/111016
PCT Pub. Date: Jun. 29, 2017

(65) Prior Publication Data
US 2018/0371109 A1 Dec. 27, 2018

(30) Foreign Application Priority Data

Dec. 25, 2015 (JP) .............................. JP2015-252918
Dec. 25, 2015 (JP) .............................. JP2015-252920

(51) Int. Cl.
| | | |
|---|---|---|
| C08B 15/04 | (2006.01) | |
| D21B 1/16 | (2006.01) | |
| D21H 11/04 | (2006.01) | |
| D21H 11/20 | (2006.01) | |
| D21H 13/06 | (2006.01) | |
| D01F 2/00 | (2006.01) | |
| C08B 11/12 | (2006.01) | |
| B82Y 30/00 | (2011.01) | |
| B82Y 40/00 | (2011.01) | |

(52) U.S. Cl.
CPC .............. *C08B 15/04* (2013.01); *C08B 11/12* (2013.01); *D01F 2/00* (2013.01); *D21B 1/16* (2013.01); *D21H 11/04* (2013.01); *D21H 11/20* (2013.01); *D21H 13/06* (2013.01); *B82Y 30/00* (2013.01); *B82Y 40/00* (2013.01)

(58) Field of Classification Search
None
See application file for complete search history.

(56) References Cited

U.S. PATENT DOCUMENTS

| | | | |
|---|---|---|---|
| 9,074,077 B2 | 7/2015 | Harada et al. | |
| 2010/0233481 A1* | 9/2010 | Isogai | C08B 15/04 428/401 |
| 2012/0283363 A1* | 11/2012 | Kumamoto | C08J 5/045 524/35 |
| 2015/0093560 A1 | 4/2015 | Nemoto et al. | |
| 2016/0333116 A1 | 11/2016 | Nakatani et al. | |

FOREIGN PATENT DOCUMENTS

| | | |
|---|---|---|
| EP | 0859011 A1 | 8/1998 |
| EP | 2857583 A1 | 4/2015 |
| JP | 2009-203559 A | 9/2009 |
| JP | 2012-021081 A | 2/2012 |
| JP | 2012-081533 A | 4/2012 |
| JP | 2013-043963 A | 3/2013 |
| JP | 2014-508228 A | 4/2014 |
| JP | 2015-3386 A | 1/2015 |
| JP | 2015-105366 A | 6/2015 |
| JP | 2015-134873 A | 7/2015 |
| JP | 2016-196534 A | 11/2016 |
| WO | 2010/134357 A1 | 11/2010 |
| WO | 2012/107642 A1 | 8/2012 |
| WO | 2012/124652 A1 | 9/2012 |
| WO | 2013/031601 A1 | 3/2013 |
| WO | 2013/183415 A1 | 12/2013 |
| WO | 2015/107995 A1 | 7/2015 |
| WO | 2017/022052 A1 | 2/2017 |

OTHER PUBLICATIONS

International Search Report for Application No. PCT/JP2016/088371, dated Mar. 28, 2017. 2 pages.
Supplementary European Search Report for Application No. 16878903.0, dated Oct. 24, 2019, 6 pages.

* cited by examiner

*Primary Examiner* — Dennis R Cordray
(74) *Attorney, Agent, or Firm* — McCarter & English, LLP; Steven G. Davis; Wei Song

(57) ABSTRACT

A method for producing a dry solid of cellulose nanofiber, the method comprising (A) preparing a dispersion in which cellulose nanofiber with an average fiber diameter of 2 to 500 nm is dispersed in a mixed solvent of water and a water-soluble organic solvent; and (B) drying the dispersion.

19 Claims, No Drawings

METHOD FOR PRODUCING CELLULOSE NANOFIBER DRY SOLID

CROSS-REFERENCE TO RELATED APPLICATIONS

This application is a U.S. national stage filing, under 35 U.S.C. § 371(c), of International Application No. PCT/JP2016/088371, filed on Dec. 22, 2016, which claims priority to Japanese Patent Application No. 2015-252918, filed on Dec. 25, 2015; and Japanese Patent Application No. 2015-252920, filed on Dec. 25, 2015. The entire contents of each of the aforementioned applications are incorporated herein by reference.

TECHNICAL FIELD

The present invention relates to a method for producing a dry solid of cellulose nanofiber.

BACKGROUND ART

A cellulose nanofiber (hereinafter referred to as "CNF") is a fine fiber with a fiber diameter of about 2 to a few hundred nm. Since it has good dispersibility in a water-based medium, it is expected to be used in the fields such as food, cosmetics, medical products or paint, etc. Specifically it is expected to be used for retention of viscosity in paint, strengthening of food ingredients or doughs, retention of water, enhancement of food stability, low-calorie additives, or additives for emulsification stabilization, etc.

When CNFs dispersed in water (wet state) are dried, hydrogen bonds are formed among fine cellulose fibers in a solid, and it is difficult or impossible to restore the properties such as solubility, dispersibility, degree of sedimentation, and viscosity to those before drying (wet state), even if water is added to the dry solid. As such, the CNF is normally manufactured in a dispersed state in water (wet state), and used in a wet state, without being dried, for various applications. However, since wet CNF requires water of a few to a few hundred times the weight of CNF for its stabilization, it gives rise to many problems, such as securing of storage space, and an increase in the storage and delivery cost, etc. To solve these problems, freeze-drying method, critical point drying method, and a method of drying after pH adjustment (PTL1), etc. are proposed.

CITATION LIST

Patent Literature

[PTL 1] JP 2015-134873 A

SUMMARY OF INVENTION

Technical Problem

However, when CNF is to be freeze-dried, a large energy is required. In addition, when water in between the fine fibers of CNF is frozen under certain conditions, ice crystals that are larger than the gap between fine cellulose fibers are created, and associations among the fine fibers of CNF occur. This makes it difficult to restore the original state of CNF. Further, the CNF dispersion turns yellow when dried by heating, whereby its usage is limited.

In view of the above problems, the present invention aims to provide a CNF dry solid that can restore its original, wet-state properties when redispersed in a dispersion medium.

Solution to Problem

The above problems are solved by the invention shown below.

(1) A method for producing a dry solid of cellulose nanofiber, the method comprising:
step (A) of preparing a mixture comprising cellulose nanofiber with an average fiber diameter of 2 to 500 nm, water, and a water-soluble organic solvent; and
step (B) of drying the mixture.

(2) The method according to (1), wherein step (A) comprises mixing a cellulose nanofiber aqueous dispersion obtained by defibrating a cellulose material in water with the water-soluble organic solvent and precipitating cellulose nanofiber.

(3) The method according to either (1) or (2), wherein the dry solid further comprises a water-soluble polymer.

(4) The method according to (3), wherein step (A) comprises mixing a cellulose nanofiber aqueous dispersion obtained by defibrating a cellulose material in water with the water-soluble polymer and the water-soluble organic solvent.

(5) The method according to (4), wherein an amount of the water-soluble polymer to be mixed is 1 to 100 wt % against an absolute dry solid content of the cellulose nanofiber.

(6) The method according to (2) to (5), wherein step (A) comprises dropping the aqueous dispersion of cellulose nanofiber into the water-soluble organic solvent to precipitate cellulose nanofiber.

(7) The method according to any one of (1) to (6), wherein an amount of carboxyl group in the cellulose nanofiber in step (A) is 0.6 to 3.0 mmol/g against an absolute dry weight of the cellulose nanofiber.

(8) The method according to any one of (1) to (6), wherein a degree of carboxymethyl substitution per glucose unit of the cellulose nanofiber in step (A) is 0.01 to 0.50.

(9) The method according to any one of (1) to (6), wherein a degree of cation substitution per glucose unit of the cellulose nanofiber in step (A) is 0.02 to 0.50.

(10) The method according to any one of (1) to (9), wherein the water-soluble organic solvent in step (A) comprises a lower alcohol in an amount of 10 wt % or higher.

(11) The method according to any one of (1) to (10), wherein a weight ratio of the water and the water-soluble organic solvent in the mixture in step (A) is 1:10000 to 100:1.

(12) A method for producing a cellulose nanofiber dispersion comprising redispersing the dry solid of cellulose nanofiber obtained by the method according to (1) to (11) in a dispersion medium.

Advantageous Effects of Invention

The present invention provides a CNF dry solid that can restore the original properties in a wet condition when redispersed in a dispersion medium.

DESCRIPTION OF EMBODIMENTS

The present invention is described in detail below. The expression "to" in the present invention includes the end values. In other words, "X to Y" includes X and Y.

1. Method for Producing a CNF Dry Solid

The production method of the present invention comprises step (A) of preparing a mixture comprising CNF having an average fiber diameter of 2 to 500 nm, water, a water-soluble organic solvent, and step (B) of drying the mixture.

(1) Step A

In this step, a mixture comprising CNF having an average fiber diameter of 2 to 500 nm, water, and a water-soluble organic solvent is prepared. Embodiments of the mixture include a form (i) wherein CNF is dispersed in a mixed solvent of water and a water-soluble organic solvent, or a form (ii) CNF is precipitated in the mixed solvent. The mixture or dispersion (i) may be obtained by defibrating, a cellulose material in a dispersion medium. The mixture (ii) containing CNF as a precipitation, may be obtained by adding a predetermined amount of a water-soluble organic solvent to a CNF dispersion, as described below. The number average fiber length of CNF is preferably 100 nm to 100 μm.

(1-1) Material

As cellulose materials, those derived from plants (e.g. wood, bamboo, hemp, jute, kenaf, farm waste, fabric, pulp (softwood unbreached kraft pulp (NUKP), softwood bleached kraft pulp (NBKP), hardwood unbleached kraft pulp (LUKP), hardwood bleached kraft pulp (LBKP), softwood unbleached sulfite pulp (NUSP), softwood bleached sulfite pulp (NBSP), thermomechanical pulp (TMP), recycled pulp, waste paper, etc.), animals (e.g. Ascidiacea), algae, microorganisms (e.g. Acetobacter), or microorganism products, etc., are known. Any of them may be used in the present invention. In the present invention, cellulose fibers derived from plants or microorganisms are preferably used, and cellulose fibers derived from plants are more preferably used. As explained below, chemically modified cellulose materials are preferred.

[Carboxymethylation]

Carboxymethylated cellulose may be used as the chemically modified cellulose material. As such cellulose, cellulose materials that are carboxymethylated by a known process may be used, and a commercially available product may also be used. In both cases, the degree of substitution of the carboxymethyl group per a unit of anhydrous glucose in cellulose is preferably 0.01 to 0.50. An example of a method for producing such carboxymethylated cellulose is shown below. First, the aforementioned cellulose material is used as a starting material, and mixed with a solvent and a mercerization agent to perform a mercerization treatment at a reaction temperature of 0 to 70° C., preferably 10 to 60° C., for a reaction time of 15 min. to 8 h., preferably 30 min. to 7 h. 3 to 20 weight times of water or a lower alcohol, specifically, water, methanol, ethanol, N-propylalcohol, isopropylalcohol, N-butanol, isobutanol, tertiary butanol, or a combination thereof may be used as the solvent. When mixing a lower alcohol, it is mixed at 60 to 95 wt %. An alkali metal hydroxide, specifically sodium hydroxide or potassium hydroxide, in an amount of 0.5 to 20 times in mole per an anhydrous glucose residue in the starting material may be used as the mercerization agent.

Then, a carboxymethylation agent is added in an amount of 0.05 to 10.0 times in mole per a glucose residue to perform an etherification reaction at a reaction temperature of 30 to 90° C., preferably 40 to 80° C., for a reaction time of 30 min. to 10 h., preferably 1 h. to 4 h. to obtain carboxymethylated cellulose. As mentioned above, the degree of carboxymethyl substitution per a glucose unit is preferably 0.01 to 0.50. When the degree of substitution is smaller than 0.01, the cellulose may not be fully nanodefibrated. On the other hand, when the degree of carboxymethyl substitution per a glucose unit is greater than 0.50, the cellulose will swell or dissolve so that it cannot be obtained in the form of a nanofiber.

[Carboxylation]

As the chemically modified cellulose material, carboxylated (oxidized) cellulose (also referred to as "oxidized cellulose") may be used. Carboxylated cellulose may be obtained by carboxylating (oxidizing) the aforementioned cellulose material by a known method. Without being limited thereby, the amount of carboxyl group is preferably 0.6 to 3.0 mmol/g against an absolute dry weight of CNF, and more preferably 1.0 to 2.0 mmol/g.

An example of a carboxylation (oxidation) method includes a method of oxidizing the cellulose material in water in the presence of an N-oxyl compound and a compound selected from a group consisting of a bromide, an iodide or a mixture thereof, using an oxidant. By this oxidation reaction, the primary hydroxyl group on the C6 position of a glucopyranose ring on the cellulose surface is selectively oxidized, and a cellulose fiber having an aldehyde group and a carboxyl group (—COOH) or a carboxylate group (—COO$^-$) is obtained. There is no particular limitation to the concentration of cellulose during the reaction, but a concentration of 5 wt % or lower is preferred.

An N-oxyl compound is a compound that may generate a nitroxyl radical. Any compound that promotes the desired oxidation reaction may be used as the N-oxyl compound. Examples include 2,2,6,6-tetramethylpiperidine-1-oxy radical (TEMPO) and a derivative of the same (e.g. 4-hydroxy TEMPO).

The amount of N-oxyl compound to be used is not limited as long as it is a catalytic amount that can oxidize the cellulose material. For example, the amount may preferably be 0.01 to 10 mmol against 1 g of absolute dry cellulose, more preferably 0.01 to 1 mmol, and even more preferably 0.05 to 0.5 mmol. Also, the amount may preferably be about 0.1 to 4 mmol/L against the reaction system.

A bromide is a compound containing bromine, and its example includes an alkali metal bromide that can be ionized by dissociation in water. Further, an iodide is a compound containing iodine, and its example includes an alkali metal iodide. The amount of bromide or iodide to be used may be selected from a range that promotes oxidation reaction. The total amount of bromides and iodides is, for example, preferably 0.1 to 100 mmol against 1 g of absolute dry cellulose, more preferably 0.1 to 10 mmol, and even more preferably 0.5 to 5 mmol.

As an oxidant, a known product may be used, which includes, for example, halogens, hypohalous acid, halous acids, perhalogen acids or salts thereof, halogen oxides or peroxide. In particular, sodium hypochlorite that is low in cost, and low in environmental load is preferable. The appropriate amount of the oxidant to be used is preferably 0.5 to 500 mmol, more preferably 0.5 to 50 mmol, even more preferably 1 to 25 mmol, and most preferably 3 to 10 mmol, against 1 g of absolute dry cellulose. It is also preferred for the oxidant to be 1 to 40 mol against 1 mol of N-oxyl compound.

In the oxidation step of cellulose, the reaction may progress efficiently even under a relatively mild condition. Hence, the reaction temperature is preferably 4 to 40° C., or may be at room temperature of about 15 to 30° C. As the reaction progresses, carboxyl groups are formed in the cellulose, and the pH of the reaction solution is decreased. For an efficient progress of the oxidation reaction, it is preferable to add an alkaline solution such as a sodium hydroxide aqueous solution to maintain the pH of the reaction solution at 8 to 12, and more preferably at about 10 to 11. As the reaction medium, water is preferred for its ease of handling and the low occurrence of a side reaction.

The reaction time in the oxidation reaction may be adjusted as necessary according to the degree of the progress of oxidation, and it is normally 0.5 to 6 h., for example, about 0.5 to 4 h.

The oxidation reaction may be performed in two stages. For example, the oxidized cellulose that is obtained by filtration after the completion of the reaction may be oxidized again under the same or different reaction condition, whereby it may be efficiently oxidized without being inhibited by salt that is formed as a byproduct in the reaction in the first stage.

Another example of a carboxylation (oxidation) method includes a method of oxidizing the cellulose material by bringing the cellulose material in contact with an ozone-containing gas. By this oxidation reaction, at least the hydroxyl groups on position 2 and position 6 of the glucopyranose ring are oxidized, and the cellulose chain are decomposed. The ozone concentration of the ozone-containing gas is preferably 50 to 250 $g/m^3$, and more preferably 50 to 220 $g/m^3$. The amount of ozone to be added against the cellulose material is preferably 0.1 to 30 weight parts against 100 weight parts of a solid content of the cellulose material, and more preferably 5 to 30 weight parts. The ozone treatment temperature is preferably 0 to 50° C., and more preferably 20 to 50° C. The ozone treatment time is about 1 to 360 min., and preferably 30 to 360 min. without being particularly limited. An ozone treatment condition in this range prevents excessive oxidation and decomposition of cellulose, and provides a good yield of oxidized cellulose. An additional oxidation treatment may be performed using an oxidant after the ozone treatment. The oxidant to be used in the additional oxidation treatment is not particularly limited, and includes chlorine-based compounds such as chlorine dioxide, sodium chloride, etc., or oxygen, hydrogen peroxide, persulfuric acid, peracetic acid, etc. For example, the additional secondary oxidation treatment is performed by dissolving the oxidant in water or a polar organic solvent such as alcohol to form an oxidant solution, and immersing the cellulose material in the solution.

The amount of carboxyl group in the oxidized cellulose may be adjusted by controlling the reaction condition, such as the amount of the oxidant to be added or the reaction time.

[Cationization]

As the chemically modified cellulose, cellulose that is produced by cationizing the aforementioned carboxylated cellulose. The cation modified cellulose may be obtained by reacting the carboxylated cellulose material with a cationization agent such as glycidyltrimethylammonium chloride, 3-chloro-2-hydroxypropyl trialkylammonium hydride or a halohydrin thereof, and a catalyst that includes alkali metal hydroxide (sodium hydroxide, potassium hydroxide, etc.) in the presence of water or an alcohol containing 1 to 4 carbons.

The degree of cation substitution per a glucose unit is preferably 0.02 to 0.50. By introducing a cation substituent to cellulose, an electric repulsion occurs between the cellulose. Thus, cellulose having the cation substituent may be easily nano-defibrated. When the degree of cation substitution per a glucose unit is smaller than 0.02, the cellulose may not be fully nano-defibrated. On the other hand, when the degree of cation substitution per a glucose unit is greater than 0.50, the cellulose will swell or dissolve so that it cannot be obtained in the form of a nanofiber. To perform defibration efficiently, the cation-modified cellulose material obtained above is preferably washed. The degree of cation substitution may be adjusted by the amount of cationization agent to be reacted and the compositional ratio of water and the alcohol containing 1 to 4 carbons.

[Esterification]

As the chemically modified cellulose, an esterified cellulose may be used. The esterified cellulose may be obtained by a method including mixing a powder or an aqueous solution of phosphoric acid compound A with the aforementioned cellulose material, or a method including adding an aqueous solution of a phosphoric acid compound A to a slurry of the cellulose material.

The phosphoric acid compound A includes phosphoric acid, polyphosphoric acid, phosphorous acid, phosphonic acid, polyphosphonic acid, or esters thereof. They may be in the form of a salt. Among them, a compound having a phosphoric acid group is preferred due to its low cost, ease of handling, and its ability to improve defibration efficiency by the introduction of the phosphoric acid group to cellulose in the pulp fiber. Examples of the compound having a phosphoric acid group includes phosphoric acid, sodium dihydrogenphosphate, disodium hydrogenphosphate, trisodium phosphate, sodium pyrophosphate, sodium metaphosphate, potassium dihydrogenphosphate, dipotassium hydrogenphosphate, tripotassium phosphate, potassium pyrophosphate, potassium metaphosphate, ammonium dihydrogenphosphate, diammonium hydrogenphosphate, triammonium phosphate, ammonium pyrophosphate, ammonium metaphosphate. They may be used alone or as a combination of two or more. In particular, phosphoric acid, a sodium salt of phosphoric acid, a potassium salt of phosphoric acid, and an ammonium salt of phosphoric acid are preferred, due to high efficiency in introducing phosphoric acid, ease of defibration in the defibration step shown below, and ease in industrial application. Sodium dihydrogenphosphate, disodium hydrogenphosphate are particularly preferred. The aforementioned phosphoric acid compound A is preferably used as an aqueous solution since the uniformity of the reaction increases and the efficiency of phosphoric acid introduction increases. The pH of the aqueous solution of the phosphoric acid compound A is preferably 7 or lower since the efficiency of phosphoric acid introduction increases, and a pH of 3 to 7 is preferable to regulate hydrolysis of pulp fiber.

One example of a production method of a phosphorylated cellulose is explained below. The phosphoric acid compound A is added to a dispersion of the cellulose material with a solid content of 0.1 to 10 wt % under agitation to introduce a phosphoric acid group to cellulose. The amount of phosphoric acid compound A to be added is preferably 0.2 to 500 weight parts in an amount of phosphorous element against 100 weight parts of the cellulose material, and more preferably 1 to 400 weight parts. When the amount of the phosphoric acid compound A to be added is equal to or higher than the aforementioned lower limit, the yield of the fine fibrous cellulose may be increased. However, even when the amount exceeds the aforementioned upper limit, the effect of increasing the yield levels off, and thus, such amount is not preferable from the viewpoint of the cost.

In addition to the cellulose material or the phosphoric acid compound A, a powder or aqueous solution of compound B, which differs from the cellulose material or the phosphoric acid compound A, may be added. Compound B is not particularly limited, but basic compounds having nitrogen are preferred. The "basic" is defined as a property that the aqueous solution exhibits pink to red in the presence of the phenolphthalein indicator, or a property that the aqueous solution has a pH larger than 7. The basic compound having nitrogen used in the present invention is not particularly limited as long as the effect of the present invention can be produced, but a compound having an amino group is preferred. Examples include urea, methyl amine, ethyl amine, trimethyl amine, triethyl amine, monoethanol amine, diethanol amine, triethanol amine, pyridine, ethylene diamine, hexamethylene diamine, without being limited thereby. Urea is preferred in particular for its low cost and ease of handling. The amount of compound B to be added is preferably 2 to 1000 weight parts against 100 weight parts of the solid content of the cellulose material, and more preferably 100 to 700 weight parts. The reaction temperature is preferably 0 to 95° C., and more preferably 30 to 90° C. The reaction time is about 1 to 600 min. and preferably 30 to 480 min. without being limited thereby. When the condition of the esterification reaction is in this range, cellulose is prevented from easy dissolution due to excessive esterification, and a good yield of phosphorylated cellulose is obtained. After the obtained phosphorylated cellulose suspension is dehydrated, it is preferably subjected to heat treatment at 100 to 170° C. to suppress hydrolysis of cellulose. Further, when water is present in the heat treatment, it is preferred that heating is performed at 130° C. or lower, preferably at 110° C. or lower to remove water, and then, further healing is performed at 100 to 170° C.

The degree of substitution of phosphoric acid group per a glucose unit of phosphorylated cellulose is preferably 0.001 to 0.40. By introducing a phosphoric acid group to cellulose, an electric repulsion occurs between the cellulose. Thus, cellulose to which the phosphoric acid group is introduced may be easily nano-defibrated. When the degree of phosphoric acid group group per a glucose unit is smaller than 0.001, the cellulose may not be fully nano-defibrated. On the other hand, when the degree of substitution of phosphoric acid group per a glucose unit is greater than 0.40, the cellulose will swell or dissolve so that it cannot be obtained in the form of a nanofiber. To perform efficient defibration, the phosphorylated cellulose material obtained above is preferably boiled and then washed with cold water.

(1-2) Defibration

The cellulose fiber prepared as described above may be dispersed in a dispersion medium and subjected to a defibration treatment to prepare CNF dispersion. Water is preferred as a dispersion medium. The concentration of cellulose fiber in the dispersion subjected to defibration is preferably 0.01 to 10 wt %.

The device to be used for defibration is not particularly limited, but a device that can apply a strong shear force, such as a high-speed rotation type, colloid mill type, high pressure type, roll mill type, and ultrasound type device, is preferred. In particular, a wet, high-pressure or ultra high-pressure homogenizer that can apply a pressure of 50 MPa or higher to the dispersion, and a strong shear force may preferably be used. The pressure is more preferably 100 MPa or higher and even more preferably 140 MPa or higher. It is possible to apply a preliminary treatment to CNF using a known mixing, agitating, emulsifying and dispersing device such as a high-speed shear mixer, prior to defibration and dispersion treatment by a high pressure homogenizer. The average fiber diameter of CNF after defibration is preferably 2 to 500 nm, and more preferably 2.5 to 150 nm from the viewpoint of improving redispersion.

(1-3) Mixing with Water-soluble Organic Solvent

A mixture can be prepared by mixing a CNF dispersion obtained above and a water-soluble organic solvent. Mixing may be performed by adding the water-soluble organic solvent to the CNF dispersion, or by adding the CNF dispersion to the water-soluble organic solvent. Addition may be performed by dropping one into the other. The water-soluble organic solvent is an organic solvent that can be mixed with water. Examples include methanol, ethanol, 2-propanol, butanol, glycerine, acetone, methylethyl ketone, 1,4-dioxane, N-methyl-2-pyrrolidone, tetrahydrofuran, N,N-dimethylformamide, N,N-dimethylacetamide, dimethyl sulfoxide, acetonitrile, and a combination thereof. In particular, a lower alcohol having 1 to 4 carbons, such as methanol, ethanol, 2-propanol, etc. is preferred, and ethanol is preferred from the viewpoints of safety and availability. It is preferred that the water-soluble organic solvent contains one or more lower alcohols in an amount of 10 wt % or higher. The weight ratio in the mixture (water:water-soluble organic solvent) is not limited, but is preferably 1:10000 to 100:1, more preferably 1:1000 to 10:1, and even more preferably 1:100 to 1:1.

In the weight ratio of the predetermined range, a mixture in which CNF is precipitated can be obtained, and is preferable due to ease of separation. The weight ratio in the mixture is preferably 1:10000 to 1:1, and more preferably 1:100 to 1:2, when generating precipitation. In order to efficiently generate precipitation, it is preferred to drop a CNF dispersion, preferably a CNF aqueous dispersion, to a water-soluble organic solvent. Although it is not particularly limited, the solid-liquid separation may be performed by using a solid-liquid separation device of a centrifugal type, a vacuum type, or a pressurized type. Two or more devices may be combined for use.

The mixture may contain a water soluble polymer. A water-soluble polymer is a polymer that dissolves in water. The water-soluble polymer includes cellulose derivative (carboxymethyl cellulose, methyl cellulose, hydroxypropyl cellulose, ethyl cellulose), xanthan gum, xyloglucan, dextrin, dextran, carrageenan, Locust bean gum, alginic acid, alginate, pullulan, starch, dogtooth violet starch, kudzu starch, positive starch, phosphorylated starch, cornstarch, Arabic gum, Locust bean gum, gellan gum, polydextrose, pectin, chitin, water-soluble chitin, chitosan, casein, albumin, soy bean protein lysate, peptone, polyvinyl alcohol, polyacryl amide, sodium polyacrylate, polyvinyl pyrrolidone, polyvinyl acetate, polyamino acids, polylactic acid, polymalic acid, polyglycerin, latex, rosin-type sizing agent, petroleum resin sizing agent, urea resin, melamine resin, epoxy resin, polyamide resin, polyamide-polyamine resin, polyethylene imine, polyamine, plant gum, polyethylene oxide, hydrophilic cross linked polymer, polyacrylic acid salt, starch-polyacrylic acid copolymer, tamarind gum, gellan gum, pectin, guar gum, colloidal silica and mixtures thereof. In particular, carboxymethyl cellulose and a salt thereof is preferred from the viewpoint of compatibility. Carboxymethyl cellulose as a water-soluble polymer is distinguished from carboxymethyl cellulose nanofiber in that the former dissolves in water.

The amount of water-soluble polymer to be added is preferably 1 to 100 wt % against an absolute dry solid of CNF, and more preferably 5 to 50 wt %. When the amount is lower than 5 wt %, the redispersion effect may not be fully obtained. On the other hand, when the amount is higher than 50 wt %, characteristics of CNF such as a viscosity property and dispersion stability may be decreased. The water-soluble polymer may be added to a mixture of a cellulose material before defibration and water, but it should preferably be added to a CNF dispersion after defibration to suppress increase in viscosity. In the mixture, the water-soluble polymer exists in a dissolved form in the mixed solvent.

2. Step B

In this step, the mixture is dried to obtain a dry solid of CNF. Drying may be performed by a known method. A known drying method includes spray drying, pressing, air drying, hot air drying or vacuum drying. In the present invention, a continuous tunnel dryer, a band dryer, a longitudinal dryer, a vertical turbo dryer, a multilayered disk dryer, a ventilation dryer, a rotary dryer, an air flow dryer, a spray dryer, an atomization dryer, a cylinder dryer, a drum dryer, a screw conveyor dryer, a heating tube rotary dryer, a vibration/transportation dryer, a batch-type box-shaped dryer, a ventilation dryer, a vacuum box-shaped dryer, or an agitation dryer may be used alone or in their combination. The drying temperature is preferably 50 to 160° C. Drying time may be adjusted as necessary. An excessively low drying temperature leads to extended drying time, and an excessively high drying temperature leads to deterioration of the solid by heat.

2. CNF Dry Solid

A dry solid is a solid that contains the dispersion medium (solvent) in an amount of 20 wt % or lower. From the viewpoint of reducing the cost of transportation, the amount of dispersion medium is preferably 0 to 20 wt %, and more preferably 0 to 15 wt %. It may be absolutely dry (amount of dispersion medium 0 wt %) by drying at 105° C. for 3 h. The average fiber diameter and the average fiber length of CNF in the dry solid is preferably the same as those of CNF used in Step A. The CNF dry solid prepared from a mixture containing a water-soluble polymer contains the water-soluble polymer. The water-soluble polymer exists on the fiber surface or between fibers.

There is a characteristic (redispersibility) that the properties (solubility, dispersiblity, precipitation, and viscosity, etc.) of the dispersion obtained by redispersing the dry solid of CNF of the present invention in a dispersion medium does not vary so much from the properties of the dispersion before drying. The reason such redispersibility is expressed is unknown, but it is presumed that drying CNF in a water-soluble organic solvent can reduce or prevent the development of hydrogen bond between fibers and the entanglement of fibers, which are considered as factors of reduction in redispersibility. In particular, the dry solid of CNF obtained from a mixture that contains a water-soluble polymer is not easily colored. The reason is presumed that deterioration by heat is prevented by providing good redispersibility and quick drying at a relatively low temperature, and change in colors are prevented.

The device for redispersing the dry solid in a dispersion medium is not particularly limited. A dispersion device such as a homomixer may be used for dispersion. The dispersion medium is most preferably water, and the solid content in the dispersion medium preferably 0.1 to 10 wt %, more preferably 1 to 5 wt %, without being limited thereby.

EXAMPLES

The present invention is explained in more detail by referring to EXAMPLES, but is not limited thereby.

<Production of CNF Aqueous Dispersion Derived from Carboxylated (TEMPO-Oxidized) Pulp>

A bleached, unbeaten softwood kraft pulp (whiteness 85%) in an amount of 5 g (absolute dry weight) was added to 500 mL of an aqueous solution that dissolves 39 mg of TEMPO (Sigma Aldrich) and 514 mg of sodium bromide, and the mixture was agitated until the pulp was dispersed evenly. A sodium hypochlorite solution was added to the reaction mixture to an amount of 5.5 mmol/g, and an oxidation reaction was started. Although the pH in the mixture decreased during the reaction, 3M sodium hydroxide solution was gradually added to adjust the pH to 10. The reaction was ended when sodium hypochlorite was consumed and the pH in the mixture stopped changing. Pulp was separated from the mixture by a glass filter, and the pulp was fully washed to obtain oxidized pulp (also referred hereinafter as "carboxylated cellulose," "carboxylated pulp," or "TEMPO-oxidized pulp"). The pulp yield was 90%, the time required for oxidation reaction was 90 min., and the amount of carboxyl group was 1.6 mmol/g.

Then, TEMPO-oxidized pulp was adjusted to 1.0% (w/v) by water, and processed five times with a high pressure homogenizer (20° C., 150 MPa) to obtain a CNF aqueous dispersion derived from TEMPO-oxidized pulp.

<Measurement Method of Amount of Carboxyl Group>

A slurry containing 0.5 wt % of carboxylated cellulose (aqueous dispersion) was prepared in an amount of 60 mL, which was adjusted to pH 2.5 adding 0.1 M hydrochloric acid aqueous solution, then, the electric conductivity was measured as 0.05N sodium hydroxide solution was dropped until a pH of 11 to calculate the amount of carboxyl group from the amount of sodium hydroxide (a) consumed in the neutralization stage of weak acid, which shows a mild change in the electric conductivity, using the following formula:

$$\text{amount of carboxyl group [mmol/g carboxylated cellulose]} = a \text{ [mL]} \times 0.05/\text{carboxylated cellulose mass [g]}.$$

<Production of CNF Aqueous Dispersion Derived from Carboxymethylated Pulp>

Pulp (NBKP (softwood bleached kraft pulp), Nippon Paper Co.) in a dry weight of 200 g, and sodium hydroxide in a dry weight of 111 g were added to an agitator that can mix pulp, and water was added to achieve a pulp solid content of 20% (w/v). Then, 216 g (active component conversion) of sodium monochloroacetate was added after 30 min. of agitation at 30° C. After 30 min. of agitation, the temperature was raised to 70° C. and the mixture was agitated for 1 h. Then, the reaction product was taken out of the agitator to be neutralized and washed to obtain carboxymethylated pulp with a degree of carboxymethyl substitution per glucose unit of 0.25. Subsequently, the carboxymethylated pulp was adjusted by water to a solid content of 1%, and subjected 5 times to a treatment using a high pressure homogenizer at 20° C. and a pressure of 150 MPa for defibration to obtain a CNF aqueous dispersion derived from carboxymethylated pulp.

<Measurement Method of Degree of Carboxymethyl Substitution Per Glucose Unit>

About 2.0 g (absolute dry weight) of carboxymethylated cellulose fiber was precisely weighed and put in a 300 mL volume stoppered Erlenmeyer flask. To the flask was added 100 mL of a solution composed by adding 100 mL of special grade concentrated nitric acid to 1000 mL of methanol nitrate, shaking the solution for 3 h., and converting carboxymethylated cellulose salt (CM cellulose) to a hydrogen-type CM cellulose. The hydrogen-type CM cellulose (absolute dry weight) 1.5 to 2.0 g was precisely weighed and put in a 300 mL volume stoppered Erlenmeyer flask. The hydrogen-type CM cellulose was wetted by 15 mL of 80% methanol, and 100 mL of 0.1N NaOH was added to be shaken at room temperature for 3 h. Phenolphthalein was used as an indicator to perform back titration of excessive NaOH with 1N of $H_2SO_4$. The degree of carboxymethyl substitution (DS) was calculated by the following formula.

$$A=[(100\times F'-(0.1N\ H_2SO_4)(ml)\times F)\times 0.1]/(\text{absolute dry weight of Hydrogen-type CM cellulose (g)})$$

$$DS=0.162\times A/(1-0.058\times A)$$

A: Amount of 1N NaOH (mL) required for neutralizing 1 g of Hydrogen-type CM cellulose
F': Factor of 0.1N $H_2SO_4$
F: Factor of 0.1N NaOH <Production of CNF Aqueous Dispersion Derived from Cationized Pulp>

Pulp (LBKP, Nippon Paper Co.) in a dry weight of 200 g, and sodium hydroxide in a dry weight of 24 g were added to an agitator that can mix pulp, and water was added to achieve pulp solid content of 15 wt %. Then, the pulp was agitated at 30° C. for 30 min. and the temperature was raised to 70° C., after which 190 g (active component conversion) of 3-chloro-2-hydroxypropyltrimethylammonium chloride was added. After 1 h. of reaction, the reaction product was taken out of the agitator to be neutralized and washed to obtain cation-modified cellulose with a degree of cation substitution per glucose unit of 0.04. Subsequently, the cation-modified cellulose was adjusted by water to a solid concentration of 1% (w/v), and subjected 5 times to a treatment using a high pressure homogenizer at 20° C. and a pressure of 140 MPa to obtain a CNF aqueous dispersion derived from cation-modified cellulose.

<Measurement Method of Degree of Cation Substitution Per Glucose Unit>

The degree of cation group substitution was calculated by measuring the nitrogen content with a total nitrogen analyzer TN-10 (Mitsubishi Chemical Corp.) after drying the sample (cation-modified cellulose) and using the following formula. The degree of substitution used herein is the average number of moles of a substituent per 1 mol of anhydrous glucose.

$$\text{Degree of cation substitution}=(162\times N)/(1-151.6\times N)$$

N: Nitrogen content

<Measurement of Average Fiber Diameter, Average Fiber Length, Aspect Ratio of CNF>

The average fiber diameter and average fiber length of CNF were analyzed for 200 fibers selected randomly using a field emission scanning electron microscope (FE-SEM). The aspect ratio was calculated using the following formula.

$$\text{Aspect ratio}=\text{Average fiber length}/\text{Average fiber diameter}$$

<Measurement of Brookfield Viscosity>

The Brookfield viscometer was used to measure CNF (solid content 1.0%, 25° C.) viscosity. The measurement condition was a rotation speed of 60 rpm, and 3 min.

<Measurement of Transparency>

The transparency (transmittance of 660 nm light) of the CNF aqueous dispersion (solid content 1.0 wt %) was measured using a UV spectrophotometer U-3000 (Hitachi High-Technologies).

<Assessment of Restoration Rate>

The restoration rate of transparency and viscosity were calculated by the following formula.

$$\text{Restoration rate (\%)}=(\text{Viscosity or transparency after redispersion})/(\text{Viscosity or transparency before drying})\times 100$$

<Assessment of Coloring>

The cellulose nanofiber aqueous dispersion obtained by redispersion (solid concentration 1.0 wt %) was assessed visually on the following basis.
Not colored: ++>+>±>–>––: Colored Example A1

100 g of 1.0 wt % aqueous dispersion of CNF (average fiber diameter: 4 nm, aspect ratio: 150) derived from the carboxylated pulp was dropped into 400 g of ethanol, and agitated with a stirrer to generate CNF precipitation. A Buechner funnel was used for solid/liquid separation, and the filtration residue was dried with an air dryer at 50° C. until a solid concentration of 95 wt % to obtain a dry solid of CNF.

Next, water was added to the dry solid of CNF obtained above to form a mixture of 1 wt % of CNF, and the mixture was agitated for 60 min. using a TK homomixer (3,000 rpm) to obtain a dispersion in which the dry solid of CNF is redispersed, and the dispersion was assessed.

Example A2

A dry solid of CNF and a dispersion in which the dry solid is redispersed was obtained and assessed by the same process as that in Example A1, except, that 100 g of 1.0 wt % aqueous dispersion of CNF derived from the carboxylated pulp was dropped into 100 g of ethanol and was agitated with a stirrer to generate CNF precipitation.

Example A3

A dry solid of CNF and a dispersion in which the dry solid is redispersed was obtained and assessed by the same process as that in Example A1, except that 100 g of 1.0 wt % aqueous dispersion of CNF derived from the carboxylated pulp was dropped into 400 g of methanol and was agitated with a stirrer to generate CNF precipitation.

Example A4

A dry solid of CNF and a dispersion in which the dry solid is redispersed was obtained and assessed by the same process as that in Example A1, except that CNF (average fiber length 12 nm, aspect ratio: 130) derived from carboxymethylated pulp was used.

Example A5

A dry solid of CNF and a dispersion in which the dry solid is redispersed was obtained and assessed by the same process as that in Example A1, except that 100 g of 1.0 wt % aqueous dispersion of CNF derived from the carboxymethylated pulp was dropped into 100 g of ethanol and was agitated with a stirrer to generate CNF precipitation.

Example A6

A dry solid of CNF and a dispersion in which the dry solid is redispersed was obtained and assessed by the same process as that in Example A1, except that CNF (average fiber length 20 nm, aspect ratio: 110) derived from the cationized pulp was used.

Example A7

A dry solid of CNF and a dispersion in which the dry solid is redispersed was obtained and assessed by the same process as that in Example A1, except that 100 g of 1.0 wt % aqueous dispersion of CNF derived from the cationized pulp was dropped into 100 g of ethanol and was agitated with a stirrer to generate CNF precipitation.

Comparative Example A1

100 g of 1.0 wt % aqueous dispersion of CNF derived from the carboxylated pulp was dried with an air dryer at 50° C. until the solid concentration was 95 wt % to obtain a dry solid of CNF. The dry solid of CNF and a dispersion in which the dry solid is redispersed was obtained and assessed by the same process as that in Example A1.

Comparative Example A2

A sodium hydroxide solution was added at 0.5% to 100 g of the 1.0 wt % aqueous dispersion of CNF derived from the carboxylated pulp to adjust pH to 9, then the mixture was dried by a drum dryer D0303 (Katsuragi Industry Co.) at a vapor pressure of 0.3 MPa·G and a drum rotation speed of 2 rpm to obtain a dry solid of CNF with a solid concentration of 95 wt %. The dry solid of CNF and a dispersion in which the dry solid is redispersed was obtained and assessed by the same process as that in Example A1.

Comparative Example A3

100 g of 1.0 wt % aqueous dispersion of CNF derived from the carboxymethylated pulp was dried with an air dryer at 50° C. until the solid concentration became 95 wt % to obtain a dry solid of CNF. The dry solid of CNF and a dispersion in which the dry solid is redispersed was obtained and assessed by the same process as that in Example A1.

Comparative Example A4

100 g of 1.0 wt % aqueous dispersion of CNF derived from the cationized pulp was dried with an air dryer at 50° C. until the solid concentration became 95 wt % to obtain a dry solid of CNF. The dry solid of CNF and a dispersion in which the dry solid is redispersed was obtained and assessed by the same process as that in Example A1. The result is shown in Table 1.

Example B1

0.5 g carboxymethyl cellulose was added as a water-soluble polymer to 100 g of 1.0 wt % aqueous dispersion of CNF (average fiber diameter: 4 nm, aspect ratio: 150) derived from the carboxylated pulp, and the mixture was agitated using a TK homomixer (3,000 rpm) for 30 min. to adjust the pH to 9. Then, the mixture was further agitated with a TK homomixer (3,000 rpm) for 30 min. to obtain a test liquid. The test liquid was dropped into 400 g of ethanol and agitated with a stirrer to generate a CNF precipitation. The result was subjected to solid/liquid separation using a Buechner funnel and dried with an air dryer at 50° C. until the solid concentration became 95 wt % to obtain a dry solid of CNF.

Next, water was added to the CNF dry solid obtained above to form a 1.0 wt % aqueous dispersion, and the mixture was agitated with propeller agitation (600 rpm) for 3 h. to obtain aqueous dispersion in which the dry solid of CNF is redispersed.

Example B2

A dry solid of CNF and a dispersion in which the dry solid is redispersed was obtained and assessed by the same process as that in Example B1, except that the amount of carboxymethyl cellulose to be added was 0.1 g.

Example B3

0.5 g of carboxymethyl cellulose was added to 100 g of 1.0 wt % aqueous dispersion of CNF (average fiber diameter: 4 nm, aspect ratio: 150) derived from the carboxylated pulp, and the mixture was agitated using a TK homomixer (3,000 rpm) for 30 min. to adjust the pH to 9. Then, the mixture was further agitated with a TK homomixer (3,000 rpm) for 30 min. to obtain a test liquid. The test liquid was dropped into 100 g of ethanol and agitated with a stirrer, then dried with an air dryer at 50° C. until the solid concentration became 95 wt % to obtain a dry solid of CNF.

Next, water was added to the dry solid of CNF obtained above to form a 1.0 wt % aqueous dispersion, and the mixture was agitated with propeller agitation (600 rpm) for

TABLE 1

| | | Amount in Mixture | | | Restoration Rate | |
| | | | | | Brookfield Viscosity | Transparency |
| | Chemical Modification | CNF Dispersion g | Ethanol g | Methanol g | Restoration Rate % | Restoration Rate % |
|---|---|---|---|---|---|---|
| Example A1 | Carboxylation | 100 | 400 | 0 | 76 | 94 |
| Example A2 | Carboxylation | 100 | 100 | 0 | 68 | 91 |
| Example A3 | Carboxylation | 100 | 0 | 400 | 70 | 90 |
| Example A4 | Carboxymethylation | 100 | 400 | 0 | 99 | 99 |
| Example A5 | Carboxymethylation | 100 | 100 | 0 | 98 | 99 |
| Example A6 | Cationization | 100 | 400 | 0 | 84 | 92 |
| Example A7 | Cationization | 100 | 100 | 0 | 79 | 89 |
| Comp. Example A1 | Carboxylation | 100 | 0 | 0 | 2 | 25 |
| Comp. Example A2 | Carboxylation | 100 | 0 | 0 | 1 | 33 |
| Comp. Example A3 | Carboxymethylation | 100 | 0 | 0 | 10 | 46 |
| Comp. Example A4 | Cationization | 100 | 0 | 0 | 5 | 35 |

3 h. to obtain aqueous dispersion in which the dry solid of CNF is redispersed. The dry solid of CNF and a dispersion in which the dry solid is redispersed was obtained and assessed by the same process as that in Example B1.

Example B4

A dry solid of CNF and a dispersion in which the dry solid is redispersed was obtained and assessed by the same process as that in Example B3, except that the amount of carboxymethyl cellulose to be added was 0.1 g and the amount of ethanol was 100 g.

Example B5

A dry solid of CNF and a dispersion in which the dry solid is redispersed was obtained and assessed by the same process as that in Example B3, except that the amount of ethanol was 12 g.

Example B6

A dry solid of CNF and a dispersion in which the dry solid is redispersed was obtained and assessed by the same process as that in Example B3, except that the amount of carboxymethyl cellulose to be added was 0.1 g and the amount of ethanol was 12 g.

Example B7

A dry solid of CNF and a dispersion in which the dry solid is redispersed was obtained and assessed by the same process as that in Example B1, except that methanol was used instead of ethanol.

Example B8

A dry solid of CNF and a dispersion in which the dry solid is redispersed was obtained and assessed by the same process as that in Example B2, except that methanol was used instead of ethanol.

Example B9

A dry solid of CNF and a dispersion in which the dry solid is redispersed was obtained and assessed by the same process as that in Example B1, except that CNF derived from the carboxymethylated pulp was used (average fiber length 12 nm, aspect ratio: 130).

Example B10

A dry solid of CNF and a dispersion in which the dry solid is redispersed was obtained and assessed by the same process as that in Example B3, except that the amount of carboxymethyl cellulose to be added was 0.1 g.

Example B11

A dry solid of CNF and a dispersion in which the dry solid is redispersed was obtained and assessed by the same process as that in Example B3, except that CNF derived from the carboxymethylated pulp was used (average fiber length 12 nm, aspect ratio: 130).

Example B12

A dry solid of CNF and a dispersion in which the dry solid is redispersed was obtained and assessed by the same process as that in Example B11, except that the amount of carboxymethyl cellulose to be added was 0.1 g.

Example B13

A dry solid of CNF and a dispersion in which the dry solid is redispersed was obtained and assessed by the same process as that in Example B1, except that CNF derived from the cationized pulp was used (average fiber length 20 nm, aspect ratio: 110).

Example B14

A dry solid of CNF and a dispersion in which the dry solid is redispersed was obtained and assessed by the same process as that in Example B13, except that the amount of carboxymethyl cellulose to be added was 0.1 g.

Example B15

A dry solid of CNF and a dispersion in which the dry solid is redispersed was obtained and assessed by the same process as that in Example B3, except that CNF derived from the cationized pulp was used (average fiber length 20 nm, aspect ratio: 110).

Example B16

A dry solid of CNF and a dispersion in which the dry solid is redispersed was obtained and assessed by the same process as that in Example B15, except that the amount of carboxymethyl cellulose to be added was 0.1 g.

Comparative Example B1

100 g of 1.0 wt % aqueous dispersion of CNF derived from the carboxylated pulp was dried with an air dryer at 105° C. until the solid concentration became 95 wt % to obtain a dry solid of CNF. The dry solid of CNF and a dispersion in which the dry solid is redispersed was obtained and assessed by the same process as that in Example B1.

Comparative Example B2

100 g of 1.0 wt % aqueous dispersion of CNF derived from the carboxymethylated pulp was dried with an air dryer at 105° C. until the solid concentration became 95 wt % to obtain a dry solid of CNF. The dry solid of CNF and a dispersion in which the dry solid is redispersed was obtained and assessed by the same process as that in Example B1.

Comparative Example B3

100 g of 1.0 wt % aqueous dispersion of CNF derived from the cationized pulp was dried with an air dryer at 105° C. until the solid concentration became 95 wt % to obtain a dry solid of CNF. The dry solid of CNF and a dispersion in which the dry solid is redispersed was obtained and assessed by the same process as that in Example B1.

Referencial Example 1

When 100 g of 1.0 wt % aqueous dispersion of CNF derived from the carboxylated pulp was dried with an air dryer at 50° C. for 3 h., the solid concentration of CNF became 6 wt %.

Referencial Example 2

When 100 g of 1.0 wt % aqueous dispersion of CNF derived from the carboxylated pulp was dried with an air dryer at 50° C. for 6 h., the solid concentration of CNF became 9 wt %.

As shown above, it is apparent that use of a water-soluble organic solvent allows a short time drying even at 50° C., and thus a dry solid of CNF may be quickly obtained. When a water-soluble organic solvent is not used, the drying takes longer, and consequently causes change in color, and in this case, it is apparent that the time, cost, and productivity in the production is undesirable.

TABLE 2

| | | Amount in mixture | | | | | | Restoration rate | | |
| --- | --- | --- | --- | --- | --- | --- | --- | --- | --- | --- |
| | Chemical modification | CNF dispersion (solid 1.0 wt %) g | Ethanol g | Methanol g | Carboxy-methyl Cellulose g | Drying temperature °C. | Drying time h. | Brookfield viscosity resoration rate % | Transparency restoration rate % | Coloring suppression |
| Example B1 | Carboxylation | 100 | 400 | 0 | 0.5 | 50 | 2 | 95 | 98 | ++ |
| Example B2 | Carboxylation | 100 | 400 | 0 | 0.1 | 50 | 2 | 91 | 95 | ++ |
| Example B3 | Carboxylation | 100 | 100 | 0 | 0.5 | 50 | 3 | 88 | 96 | + |
| Example B4 | Carboxylation | 100 | 100 | 0 | 0.1 | 50 | 3 | 85 | 94 | + |
| Example B5 | Carboxylation | 100 | 12 | 0 | 0.5 | 50 | 8 | 83 | 92 | + |
| Example B6 | Carboxylation | 100 | 12 | 0 | 0.1 | 50 | 8 | 79 | 88 | + |
| Example B7 | Carboxylation | 100 | 0 | 400 | 0.5 | 50 | 2 | 90 | 97 | ++ |
| Example B8 | Carboxylation | 100 | 0 | 400 | 0.1 | 50 | 2 | 81 | 93 | ++ |
| Example B9 | Carboxy-methylation | 100 | 400 | 0 | 0.5 | 50 | 2 | 99 | 99 | ++ |
| Example B10 | Carboxy-methylation | 100 | 400 | 0 | 0.1 | 50 | 2 | 99 | 99 | ++ |
| Example B11 | Carboxy-methylation | 100 | 100 | 0 | 0.5 | 50 | 3 | 98 | 99 | ++ |
| Example B12 | Carboxy-methylation | 100 | 100 | 0 | 0.1 | 50 | 3 | 98 | 99 | ++ |
| Example B13 | Cationization | 100 | 400 | 0 | 0.5 | 50 | 2 | 89 | 95 | ++ |
| Example B14 | Cationization | 100 | 400 | 0 | 0.1 | 50 | 2 | 84 | 92 | ++ |
| Example B15 | Cationization | 100 | 100 | 0 | 0.5 | 50 | 3 | 84 | 92 | ++ |
| Example B16 | Cationization | 100 | 100 | 0 | 0.1 | 50 | 3 | 79 | 89 | ++ |
| Comp. Example B1 | Carboxylation | 100 | — | — | — | 105 | 3 | 4 | 32 | —— |
| Comp. Example B2 | Carboxy-methylation | 100 | — | — | — | 105 | 3 | 8 | 39 | ± |
| Comp. Example B3 | Cationization | 100 | — | — | — | 105 | 3 | 2 | 32 | - |

The invention claimed is:

1. A method for producing a dry solid of cellulose nanofiber, the method comprising:
    step (A) of defibrating a cellulose material in water to obtain an aqueous dispersion of cellulose nanofiber, and mixing the aqueous dispersion of cellulose nanofiber with a water-soluble organic solvent to obtain a mixture comprising the cellulose nanofiber, water, and the water-soluble organic solvent, wherein the cellulose nanofiber has an average fiber diameter of 2 to 500 nm, wherein a weight ratio of the water to the water-soluble organic solvent in the mixture is 1:100 to 10:1, and wherein the water-soluble organic solvent is a lower alcohol having 1 to 4 carbons; and
    step (B) of drying the mixture under temperature ranging from 50 to 160° C.

2. The method according to claim 1, wherein mixing the aqueous dispersion of cellulose nanofiber with a water-soluble organic solvent in step (A) comprises precipitating cellulose nanofiber.

3. The method according to claim 1, wherein the dry solid further comprises a water-soluble polymer.

4. The method according to claim 3, wherein mixing the aqueous dispersion of cellulose nanofiber with a water-soluble organic solvent in step (A) comprises mixing the aqueous dispersion of cellulose nanofiber with the water-soluble polymer and the water-soluble organic solvent.

5. The method according to claim 4, wherein an amount of the water-soluble polymer to be mixed is 1 to 100 wt % against an absolute dry solid content of the cellulose nanofiber.

6. The method according to claim 2, wherein mixing the aqueous dispersion of cellulose nanofiber with a water-soluble organic solvent in step (A) comprises adding dropwise the aqueous dispersion of cellulose nanofiber into the water-soluble organic solvent to precipitate cellulose nanofiber.

7. The method according to claim 1, wherein an amount of carboxyl group in the cellulose nanofiber in step (A) is 0.6 to 3.0 mmol/g against an absolute dry weight of the cellulose nanofiber.

8. The method according to claim 1, wherein a degree of carboxymethyl substitution per glucose unit of the cellulose nanofiber in step (A) is 0.01 to 0.50.

9. The method according to claim 1, wherein a degree of cation substitution per glucose unit of the cellulose nanofiber in step (A) is 0.02 to 0.50.

10. The method according to claim 1, wherein a weight ratio of the water to the water-soluble organic solvent in the mixture in step (A) is 1:100 to 1:1.

11. A method for producing a cellulose nanofiber dispersion comprising redispersing the dry solid of cellulose nanofiber obtained by the method according to claim 1 in a dispersion medium.

12. The method according to claim 2, wherein the dry solid further comprises a water-soluble polymer.

13. The method according to claim 12, wherein mixing the aqueous dispersion of cellulose nanofiber with a water-soluble organic solvent in step (A) comprises mixing the aqueous dispersion of cellulose nanofiber with the water-soluble polymer and the water-soluble organic solvent.

14. The method according to claim 13, wherein an amount of the water-soluble polymer to be mixed is 1 to 100 wt % against an absolute dry solid content of the cellulose nanofiber.

15. The method according to claim 14, wherein mixing the aqueous dispersion of cellulose nanofiber with a water-soluble organic solvent in step (A) comprises adding dropwise the aqueous dispersion of cellulose nanofiber into the water-soluble organic solvent to precipitate cellulose nanofiber.

16. The method according to claim 15, wherein an amount of carboxyl group in the cellulose nanofiber in step (A) is 0.6 to 3.0 mmol/g against an absolute dry weight of the cellulose nanofiber.

17. The method according to claim 15, wherein a degree of carboxymethyl substitution per glucose unit of the cellulose nanofiber in step (A) is 0.01 to 0.50.

18. The method according to claim 15, wherein a degree of cation substitution per glucose unit of the cellulose nanofiber in step (A) is 0.02 to 0.50.

19. The method according to claim 1, wherein the dry solid has a restoration rate of Brookfield viscosity being 68% or more, and a restoration rate of transparency being 89% or more when redispersed in a dispersion medium.

\* \* \* \* \*